US 8,573,636 B2

(12) United States Patent
Berntsson

(10) Patent No.: US 8,573,636 B2
(45) Date of Patent: Nov. 5, 2013

(54) SIDE AIRBAG UNIT

(75) Inventor: Mats Berntsson, Göteborg (SE)

(73) Assignee: Autoliv Development AB, Vargarda (SE)

( * ) Notice: Subject to any disclaimer, the term of this patent is extended or adjusted under 35 U.S.C. 154(b) by 72 days.

(21) Appl. No.: 13/321,636

(22) PCT Filed: May 14, 2010

(86) PCT No.: PCT/EP2010/002969
§ 371 (c)(1),
(2), (4) Date: Nov. 21, 2011

(87) PCT Pub. No.: WO2010/136129
PCT Pub. Date: Dec. 2, 2010

(65) Prior Publication Data
US 2012/0068443 A1 Mar. 22, 2012

(30) Foreign Application Priority Data

May 29, 2009 (DE) .......................... 10 2009 023 177
Sep. 24, 2009 (DE) .......................... 10 2009 042 594

(51) Int. Cl.
B60R 21/201 (2011.01)
B60R 21/207 (2006.01)

(52) U.S. Cl.
USPC .................. 280/730.2; 280/743.1; 280/743.2

(58) Field of Classification Search
USPC ................................ 280/730.2, 743.1, 743.2
See application file for complete search history.

(56) References Cited

U.S. PATENT DOCUMENTS

| | | | | |
|---|---|---|---|---|
| 5,499,840 A | * | 3/1996 | Nakano | 280/730.1 |
| 5,810,390 A | * | 9/1998 | Enders et al. | 280/730.2 |
| 6,196,585 B1 | * | 3/2001 | Igawa | 280/743.1 |
| 6,783,151 B2 | * | 8/2004 | Rasch et al. | 280/729 |
| 7,441,796 B2 | * | 10/2008 | Noguchi et al. | 280/730.2 |
| 7,540,529 B2 | * | 6/2009 | Tracht et al. | 280/730.2 |
| 7,614,655 B2 | | 11/2009 | Hasebe | |
| 2006/0157958 A1 | | 7/2006 | Heudorfer et al. | |
| 2007/0126221 A1 | * | 6/2007 | Yoshida | 280/743.1 |
| 2008/0100043 A1 | * | 5/2008 | Sundmark et al. | 280/730.2 |
| 2008/0100044 A1 | * | 5/2008 | Cho | 280/730.2 |

FOREIGN PATENT DOCUMENTS

EP 1 798 117 A1 6/2007

OTHER PUBLICATIONS

International Search Report and Written Opinion for PCT/EP2010/002969, ISA/EP, Rijswijk, NL, mailed Jul. 29, 2010.

* cited by examiner

Primary Examiner — Ruth Ilan
(74) Attorney, Agent, or Firm — Harness, Dickey & Pierce, P.L.C.

(57) ABSTRACT

A side airbag unit for mounting on or in the backrest of a vehicle seat includes an airbag skin enclosing a gas chamber, and an inflator for filling of said gas chamber. The airbag skin exhibits a main section which serves for protection of the vehicle occupant when the side airbag is expanded and which in the resting state of the side airbag is present as a package, wherein the package is at least partly rolled. In order to provide a side airbag unit of low weight with its airbag skin nevertheless showing a controlled and reproducible expansion behavior, the airbag skin further comprises at least one auxiliary section which in the resting state encompasses the main section in two layers at least in sections, wherein an additional area of the gas chamber is present between the two layers of the auxiliary section at least in the resting state.

20 Claims, 10 Drawing Sheets

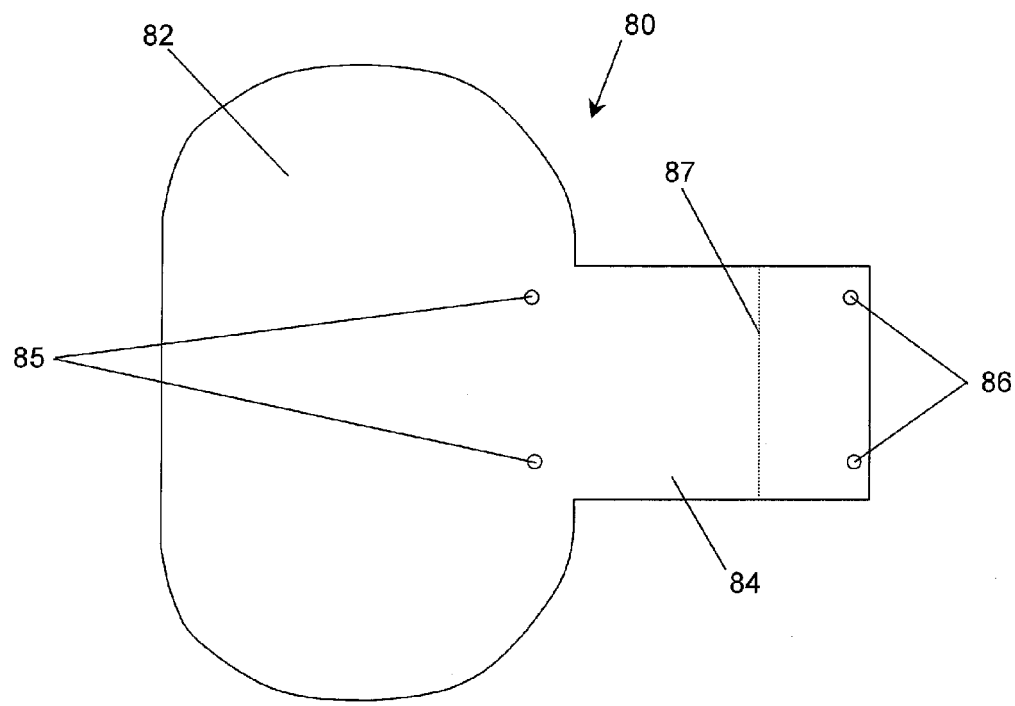
Fig. 1
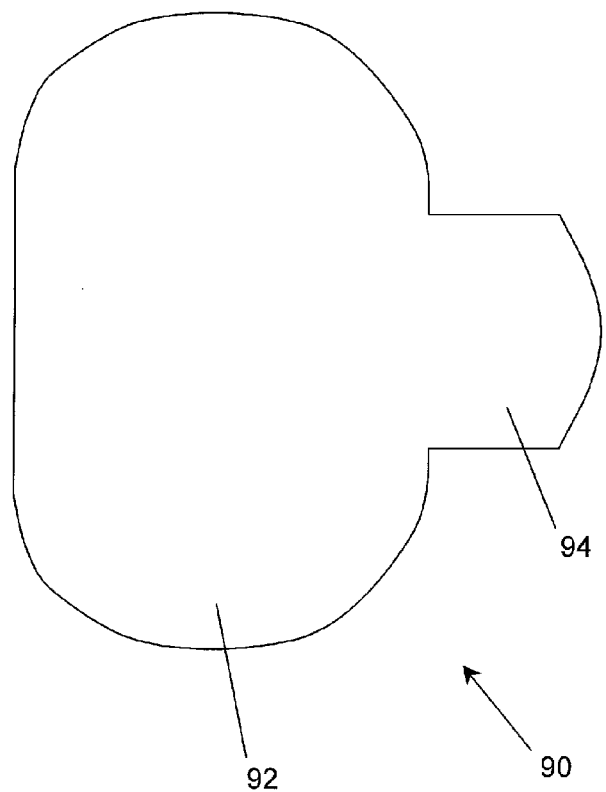

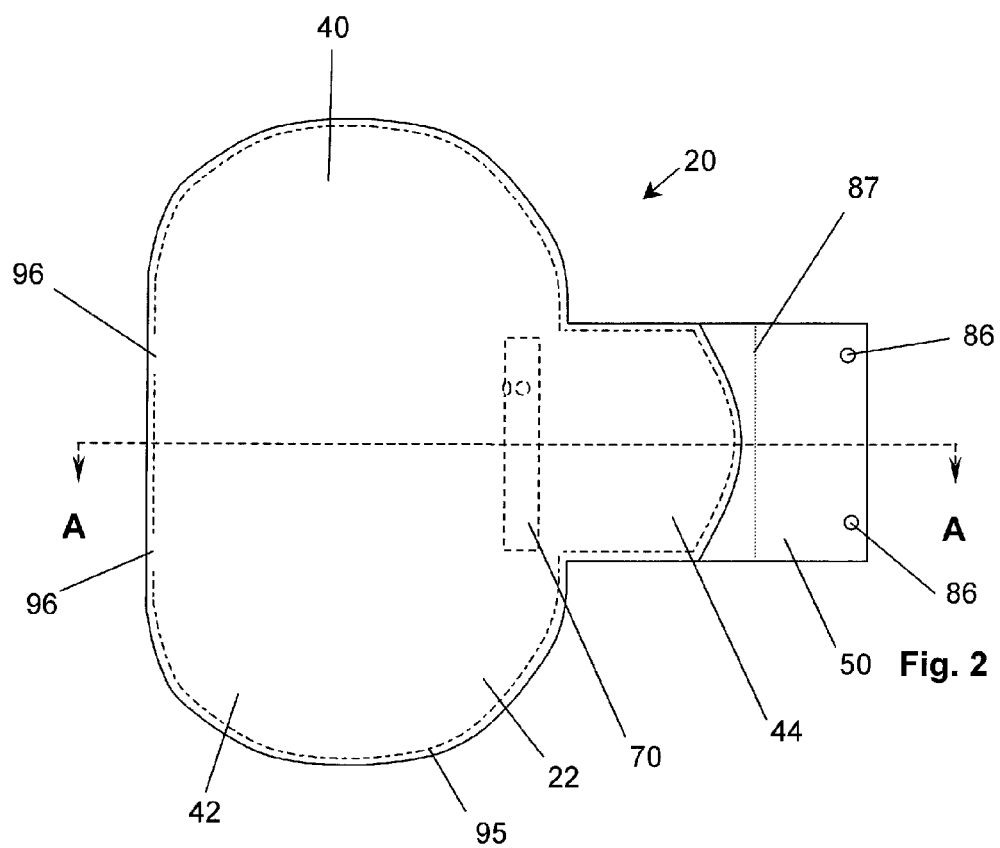
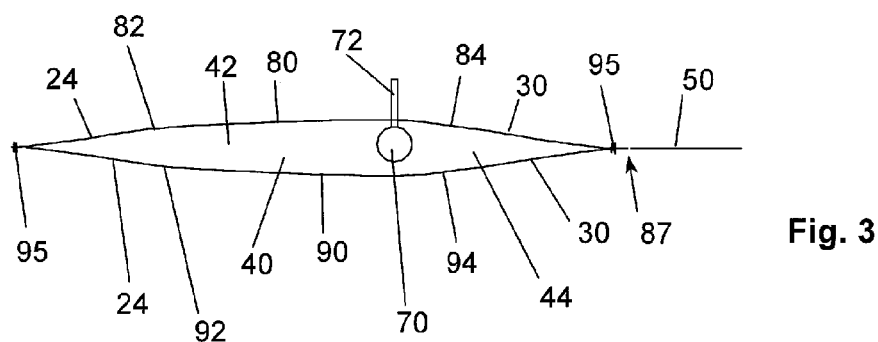
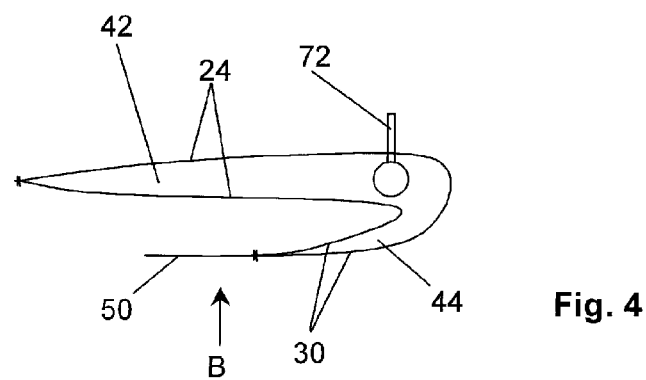

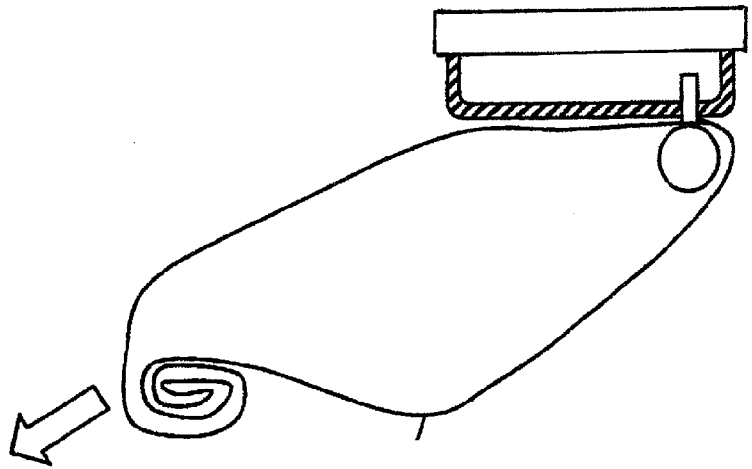
Fig. 7d
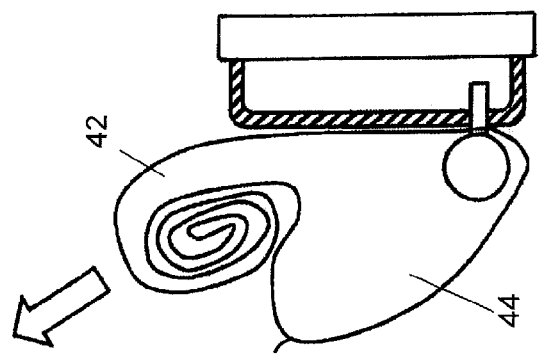
Fig. 7c
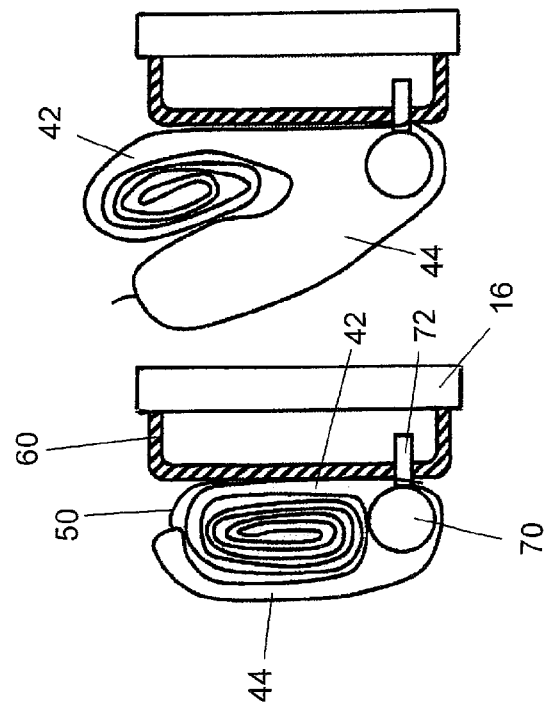
Fig. 7b
Fig. 7a

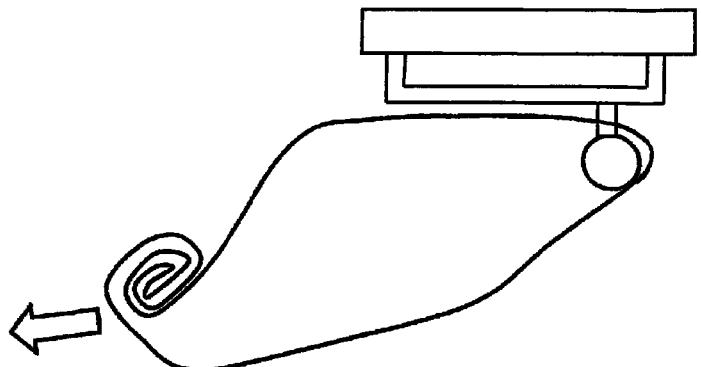
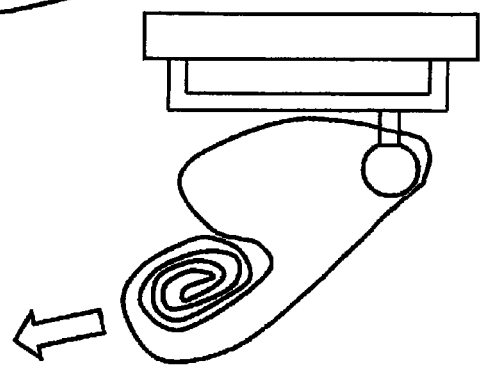
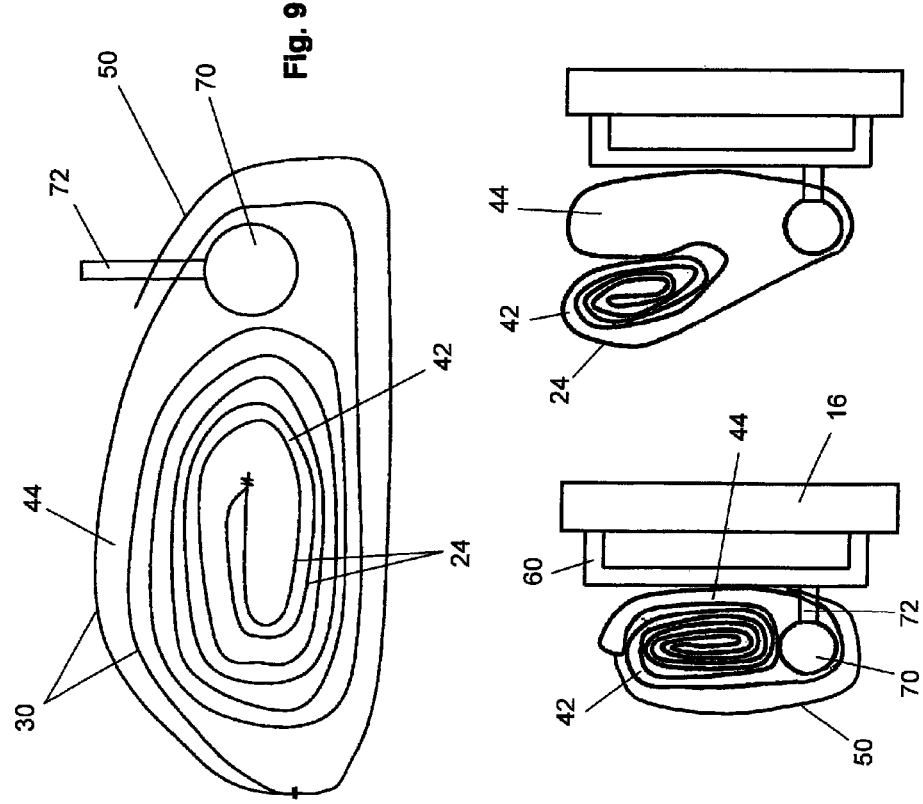

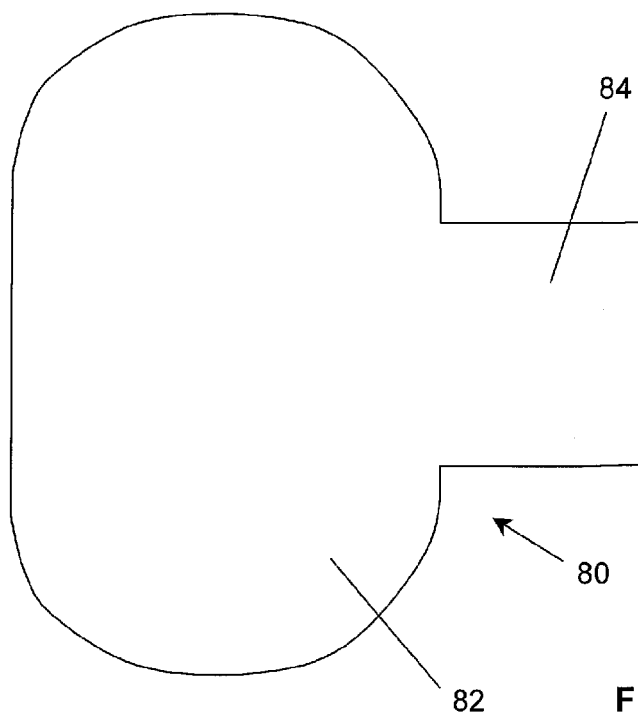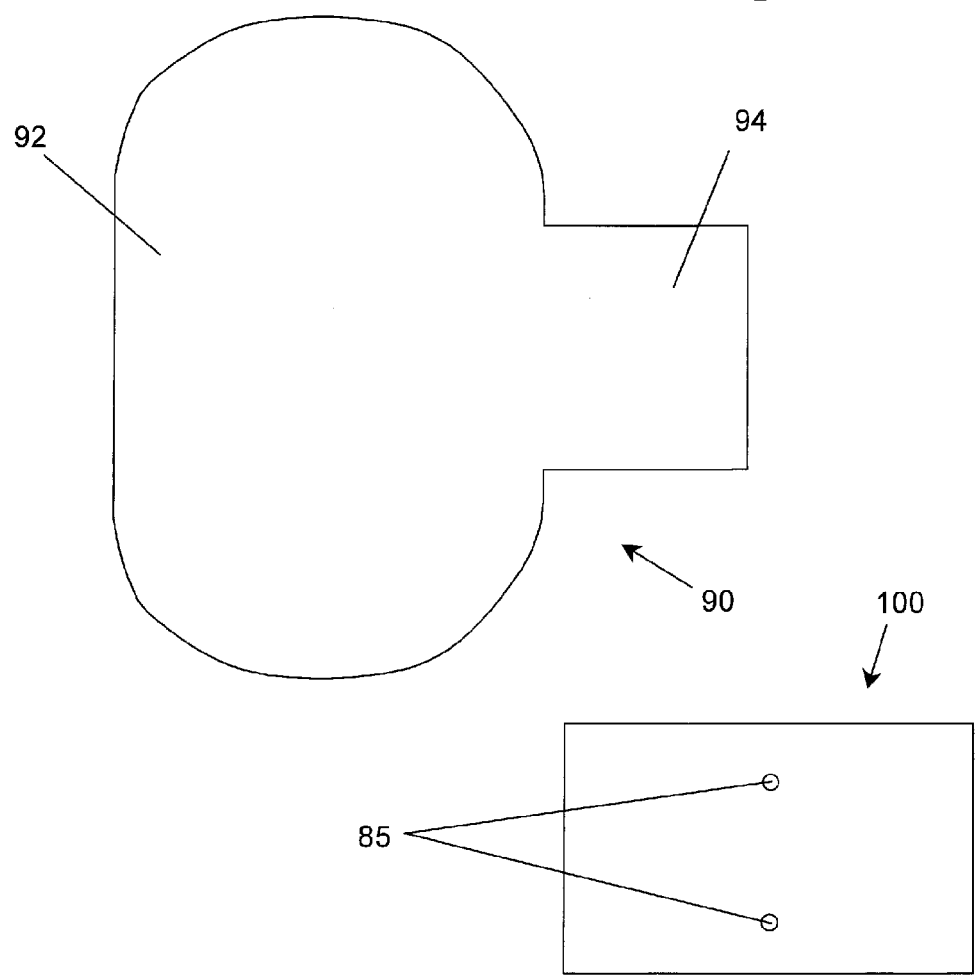
Fig. 11

SIDE AIRBAG UNIT

CROSS-REFERENCE TO RELATED APPLICATIONS

This application is a 371 U.S. National Stage of International Application No. PCT/EP2010/002969, filed May 14, 2010. This application claims priority to German Patent Applications No. DE 10 2009 042 594.2, filed Sep. 24, 2009, and DE 10 2009 023 177.3, filed May 29, 2009. The disclosures of the above applications are incorporated herein by reference.

TECHNICAL FIELD OF THE INVENTION

The invention relates to a side airbag unit for mounting in or on a backrest of a vehicle seat.

So-called side airbags are known in the field of vehicle construction and are used for protection of the vehicle occupants in case of a side impact. In most applications, the side airbag inflates between the person to be protected and the side structure of the vehicle. Two basic designs are known in this connection:

PRIOR ART

In a first basic design it is possible to locate the side airbag unit which exhibits the side airbag and an inflator—mostly a gas generator—in the side structure of the motor vehicle. The side airbag has two side walls, wherein when the side airbag is inflated, one side wall points towards the occupant and one points towards the side structure of the motor vehicle, so that the one side wall forms the impact surface and the other side wall forms the support surface. The deployment direction of the airbag is basically horizontal in the direction of travel.

The second design is more common. Here, the side airbag unit is located in the backrest of the vehicle seat and is connected with the frame of the backrest by means of an inherently stable mounting part. The airbag which is used here also exhibits two side walls, wherein the one side wall forms the impact surface. If only a small amount of space exists between the side cheek of the backrest and the side structure, and if the side airbag is made sufficiently thick, the second side wall of the side airbag comes into contact with the side structure of the vehicle in an accident situation, and this side structure therefore forms a support surface. If this cannot be ensured, the mounting part often exhibits a section lying on the outside, which supports the side airbag. Such a design, however, means that the mounting part is of not inconsiderable weight, which is naturally disadvantageous.

Various folding and/or rolling methods are known, how the airbag skin can be rolled and/or folded to a package. These different methods naturally have an influence on the manner of unfolding of the airbag skin, and therefore particularly have an influence on how aggressively the expanding airbag acts on the vehicle occupant. Because of a quite low aggressive effect on the vehicle occupant, particularly when the occupant is not in his standard sitting position (out of position), an outer roll (or out board roll) is often preferred.

In order to save weight, side airbags without a rigid, housing-type retaining part have in the meantime become known. With these, however, there is generally the problem that it is difficult to set the expansion behaviour of the airbag skin as desired. In particular in the case of the outer roll mentioned above, in the absence of a housing-type retaining part it can happen that the unfolding airbag skin catches or snags on the door cladding. In order to prevent this, rolled airbag packages have become known which additionally exhibit at least one fold. However, circumstances might occur in which the unfolding is not perfectly reproducible.

Generic patent application US 2006/0145459 A1 shows a side airbag unit whose airbag skin is specially folded in order to achieve an improved unfolding behaviour.

SUMMARY OF THE INVENTION

Starting from this, the invention sets itself the problem to improve the state of the art in such a way that the side airbag unit can be formed with low weight and its airbag skin nevertheless shows a controlled and reproducible expansion behaviour.

The side airbag unit exhibits an airbag skin enclosing a gas chamber and an inflator for filling the gas chamber. Within this arrangement, the airbag skin has a main section, which—when the airbag is expanded—serves for the protection of the vehicle occupant and which, in the resting state of the airbag skin is present in form of a package, wherein the package is at least partially rolled. According to the invention, the airbag skin also exhibits an auxiliary section, which in the resting state at least in sections encompasses the main section in two layers, wherein at least in the resting state an area of the gas chamber is located between the two layers of the auxiliary section.

By means of the measure according to the invention, the gas chamber of the side airbag exhibits an additional area in addition to the main area at least during an early expansion phase. This additional chamber supports and guides the main area during this phase. When the side airbag is fully expanded, the additional area generally no longer needs to be separated from the main area, which means that an airbag skin with very simple geometry can be used. The airbag skin can in particular be woven in one piece or can be manufactured of two cuttings connected by means of a edge seam, without additional seams or similar being necessary in the area of the transition between main area and the additional area of the gas chamber. Therefore the time and effort needed for manufacture is not or is not basically different from the time and effort needed for a conventional airbag skin for a side airbag, and also the weight basically corresponds to the weight of a conventional airbag skin. In addition, the rolling of the airbag skin into a package can be kept very simple and an additional fold is usually not necessary.

None of the above measures makes a significant contribution to the weight of the side airbag unit, so that the objective of weight reduction is achieved.

In a first preferred configuration, the auxiliary section encompasses the package from the outside, viewed from the vehicle seat, such that the additional area expands at an early stage of the deployment between the main area of the gas chamber and the side structure of the vehicle and thus directs the unfolding main section of the airbag skin away from the inner structure and prevents the main section of the airbag skin from getting stuck at the inner structure. In this configuration it is in most cases preferred to roll the package of the main section to the outside, leading to a "gentle" deployment behaviour regarding the occupant.

In a second preferred configuration, the auxiliary section encompasses the package from the inside, viewed from the vehicle seat, such that the additional area expands at an early stage of the deployment between the main area of the gas chamber and the frame and/or cushioning of the vehicle seat and thus directs the unfolding main section of the airbag skin away from the occupant and prevents the main section of the airbag skin from "shooting" against the occupant. In this configuration it is in most cases preferred to roll the package of the main section to the inside in order to prevent the main section from getting stuck at the inner structure of the vehicle.

So, one can see that in most cases it is to be preferred that the rolling direction of the main section corresponds to the position of the auxiliary section. If the main section is rolled to the outside, the auxiliary section encompasses the package at the outside and vice versa. But it needs to be emphasized that for special purpose applications it is also possible that rolling direction of the package of the main section and the position of the auxiliary section are the other way: If the main section is rolled to the outside, the auxiliary section encompasses the roll at the inside and vice versa.

In a preferred embodiment, a fabric section follows on from the auxiliary section, so that the auxiliary section and the fabric section completely encompass the package and therefore hold the package together in its rolled condition, so that the auxiliary section has a dual function.

In a second embodiment of the invention the airbag skin comprises two auxiliary sections, with a first auxiliary section encompassing the package from the outside, viewed from the vehicle seat and a second auxiliary section encompassing the package from the inside, viewed from the vehicle seat.

Further advantageous embodiments result from the further subclaims and from the embodiments now described in relation to the drawings. The drawings show:

BRIEF DESCRIPTION OF THE DRAWINGS

FIG. 1 is a view of first and second cuttings for an airbag skin in accordance with the present teachings.

FIG. 2 is a view of a side airbag unit of the present teachings including the cuttings of FIG. 1 and a gas generator.

FIG. 3 is a simplified sectional view taken along the line A-A of FIG. 2.

FIG. 4 is a simplified sectional view similar to FIG. 3, after folding of an auxiliary section of the airbag skin.

FIGS. 7a-7e are a series of views following ignition of the gas generator.

FIG. 9 is a view similar to FIG. 6 showing the side airbag unit in a second, ready to install configuration.

FIG. 10a-10d are a series of view of the side airbag unit of FIG. 9 after ignition of the gas generator.

FIG. 11 is a view of three cuttings for another airbag skin in accordance with the present teachings.

DETAILED DESCRIPTION OF PREFERRED EMBODIMENTS

Figure 8:
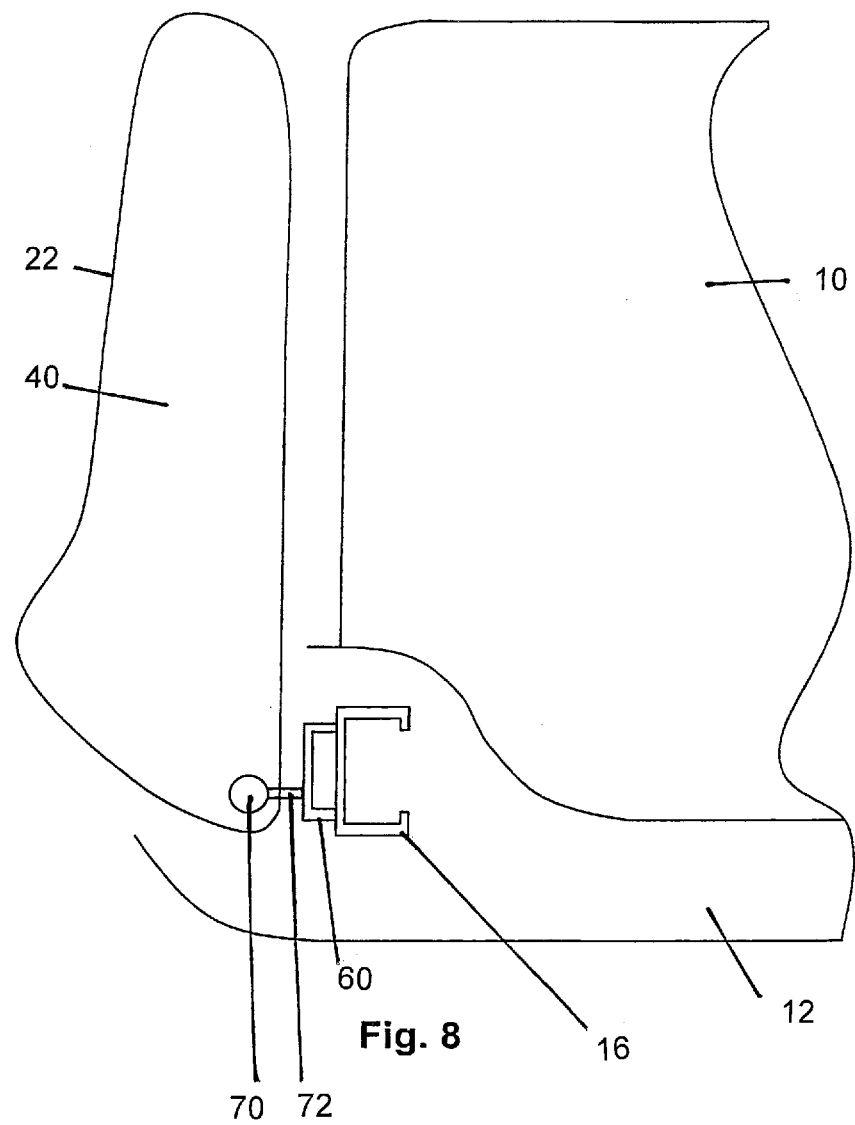
FIG. 8 is a simplified horizontal section through a backrest of a vehicle seat illustrating the side airbag in the state shown in FIG. 7e.
Figure 16:
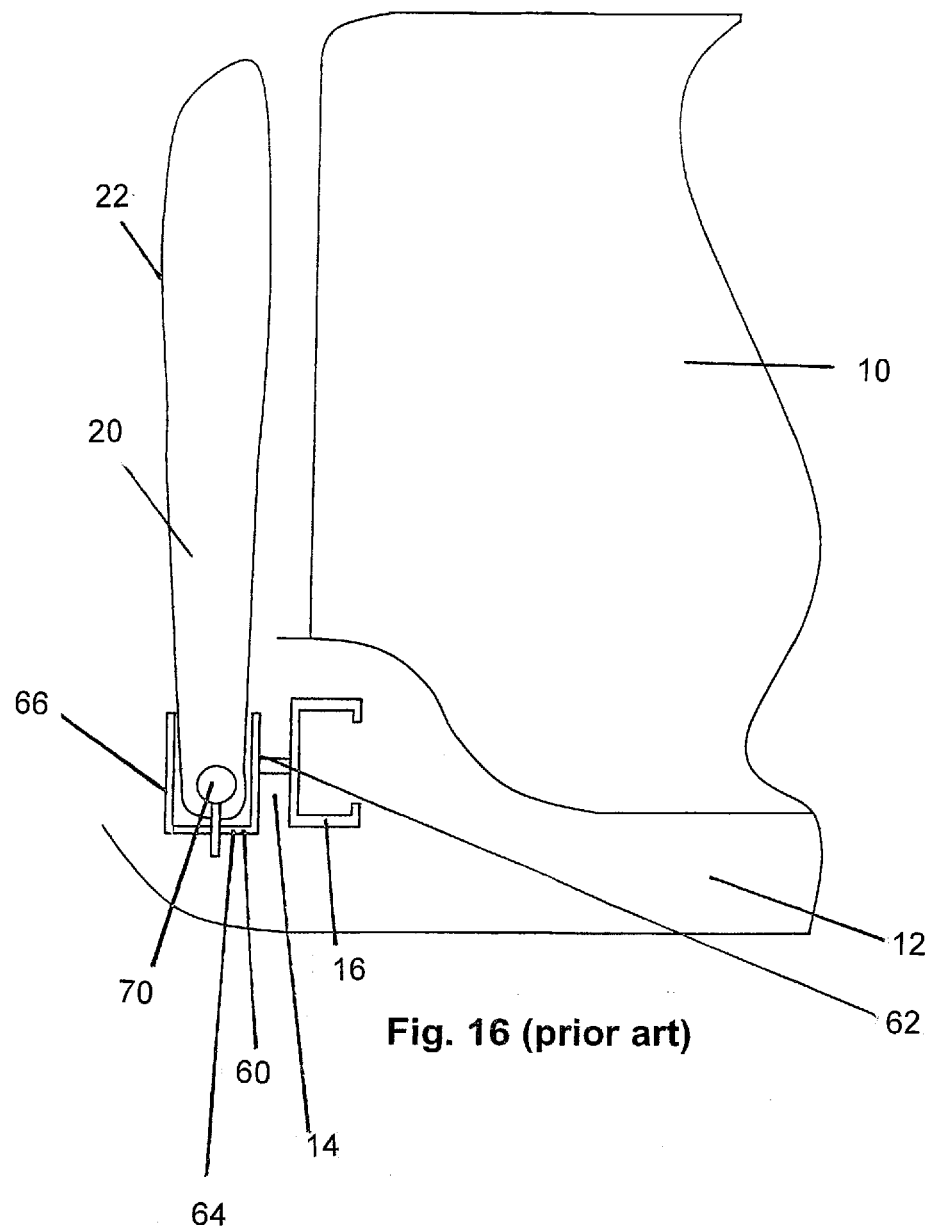
FIG. 16 is a prior art view of a side airbag unit operatively associated with a vehicle seat.

First the state of the art will be described again with reference to FIG. 16. FIG. 8 shows a horizontal section through the backrest 12 of a vehicle seat 10, on whose frame 16 a side airbag unit 20 is mounted. The side airbag unit 20 comprises an airbag skin 22, a gas generator 70 serving as inflator and a housing-type retaining part 60 located in the side cheek 14 of the backrest 12, and being connected with the frame 16. The housing-type retaining part 60 has a U-shaped cross-section with three legs 62, 64, 66.

The retaining part 60 has three legs, namely the first leg 62, the second leg 64 and the third leg 66. Within this arrangement, the third leg 66 is the outer leg and among others has the task of guiding the airbag skin 22 while it is unfolding upon ignition of the gas generator 70. For which purpose the third leg—and therefore housing 60 as a whole—has to be formed relatively stable and therefore heavy.

FIG. 1 shows two cuttings 80, 90 for an airbag skin of a side airbag. Both cuttings 80, 90 have a mushroom-like shape with a first section 82, 92 having an approximately oval shape and a second section 84, 94, following on from the first section. This second section is considerably narrower than the first section and is approximately rectangular. It can be seen that the two first sections 82, 92 of both cuttings 80, 90 are congruent, while the second section 84 of the first cutting 80 is somewhat longer than the second section 94 of the second cutting 90 and has a set break line 87 in the form of a perforation, and two fixing holes 86. In addition, two through-holes 85 are provided in the first cutting 80. Often, a further opening is present for insertion of the gas generator into the finished sewn airbag skin. As this does not contribute to the understanding of the present invention, this is not shown here.

FIG. 2 shows a side airbag unit 20, which comprises an airbag skin 22, which is sewn from the two cuttings 80 and 90 just described, and a gas generator 70 serving as inflator. The two cuttings 80, 90 just described are connected with each other by means of the edge seam 95, so that the two cuttings enclose a gas chamber 40. This gas chamber is divided in accordance with the shape of the cuttings into a main area 42 and an additional area 44, wherein the gas generator 70 is located in main area 42, but near to the transition to additional area 44. The edge seam 95 exhibits two interruptions 96 in the front area, which form outflow openings. Because the second section 84 of first cutting 80 is longer than the second section 94 of the second cutting 90, a section of the first cutting extends beyond the gas chamber 40. This section is referred to as fabric section 50, or in more general terms as flexible section. In the embodiment shown, this fabric section 50 is therefore formed in one piece with the first cutting 80 of the airbag skin 22, which is to be preferred but not obligatory. It would also be possible that the fabric section 50 is a separate cutting sewn to the first cutting 80. From FIG. 2 it can also be seen that the set break line 87 is located in this fabric section 50, in other words outside the gas chamber 40.

FIG. 3 shows a section along section A-A through the airbag unit 20 from FIG. 2. In this representation, the main area 42 of gas chamber 40 is located to the left of the gas generator 70, and the additional area 44 is located to the right of it. In the same way as the gas chamber 40 can be divided into a main area 42 and an additional area 44, it is also possible to divide the sections of the airbag skin 22 into a main section 24 and an auxiliary section 30, wherein the main section 24 is formed by the first section 82 of the first cutting 80 and the second section 92 of the second cutting 90 and the auxiliary section 30 is formed by a part of the second section 84 of the first cutting 80, namely by the part which overlaps with the second section 94 of the second cutting 92, and the second section 94 of the second cutting 90. The gas generator bolts 72 extend through the through-holes 85.

FIG. 4 shows how the auxiliary section 30 of the airbag skin 22—and therefore also the fabric section 50—is folded over towards the front, so that it lies in front of the main section 24.

Figure 5:
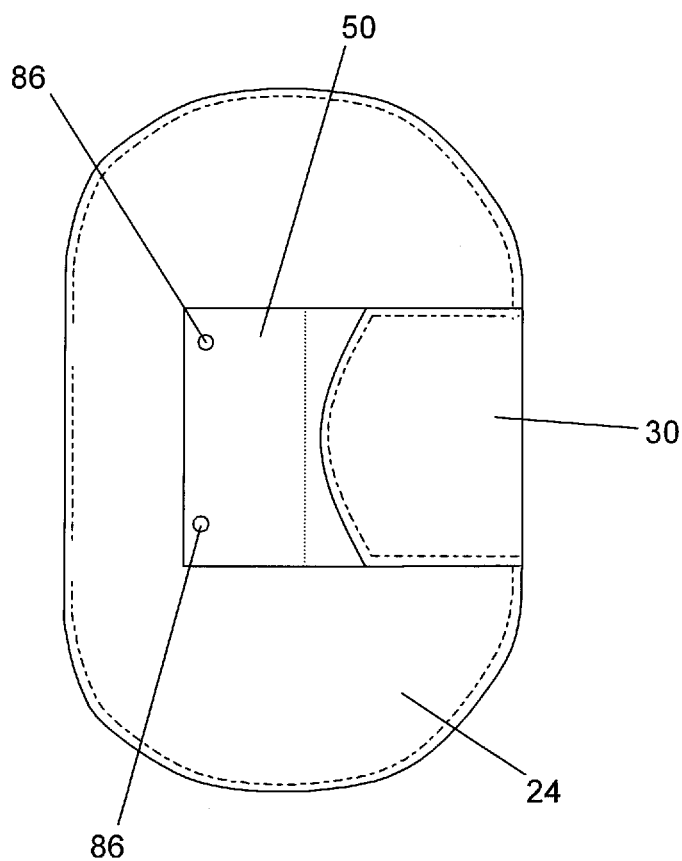
FIG. 5 is a view of the side airbag unit taken in the direction of Arrow B in FIG. 4.

FIG. 5 shows the items shown in FIG. 4 in a birds-eye view from Direction B. It should be emphasized at this point, that for reasons of weight reduction it is mostly to be preferred to form the auxiliary section narrower (this means in installed state with less height) than the main section. However, this is not obligatory. The shape shown in the embodiment, however, has the advantage that less fabric surface and a relatively low gas volume are needed, which means that only a correspondingly small gas generator is necessary.

Figure 6:
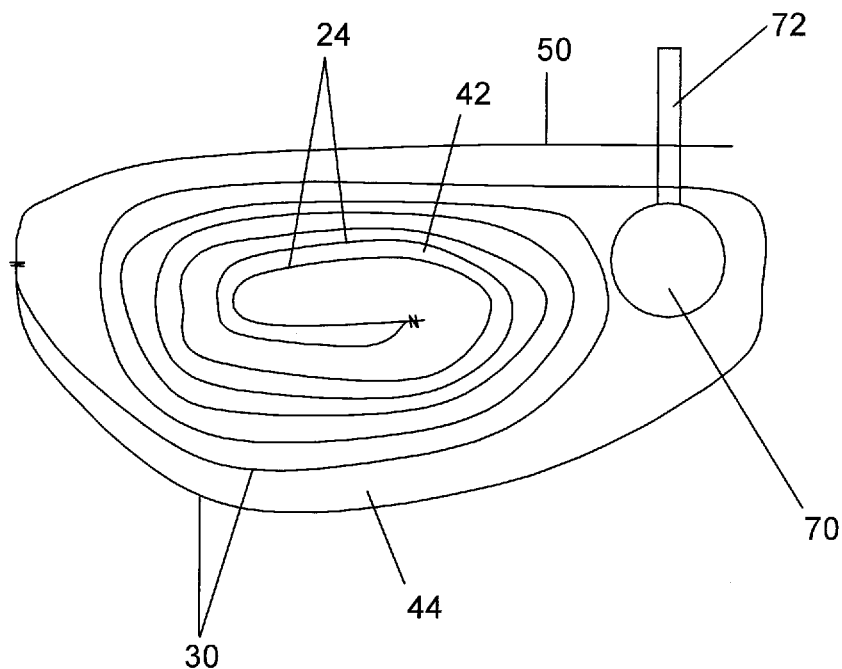
FIG. 6 is a view corresponding to FIG. 4 showing the side airbag unit ready to install.

FIG. 6 shows airbag skin 22, which was just described, in a state prepared for installation in a vehicle in a representation corresponding to FIG. 4. The main section 24 of the airbag skin 22 is fully rolled-in—no additional folding takes place—, wherein the roll points in the direction of the auxiliary section 30. Auxiliary section 30 and fabric section 50 together encompass the main section 24 rolled into a package, wherein the auxiliary section 30 and the fabric section 50 each encompass approximately around half of the package. The fixing openings 86 are hung into the gas generator bolts 72. Therefore the auxiliary section 30 and the fabric section 50 also serve as a cover holding the package together. In the state shown in FIG. 6, the additional area 44 and the main area 42 of the gas chamber 40 form almost separate chambers.

FIG. 7a shows the side airbag unit 20 shown in FIG. 6, which is fixed to a retaining part 60, which in turn is carried by a frame 16 running in a side cheek 14 of the backrest 12 of a vehicle 10. In principle, a direct mounting on the frame 16 could also be envisaged, which, however, is seldom to be preferred for practical reasons.

FIG. 7b shows the items shown in FIG. 7a immediately after the ignition of the gas generator 70. It can be seen that the additional area 44 of the gas chamber 40 fills very rapidly with gas and therefore guides the early expansion of the unrolling main section 24 of the airbag skin 22. In particular, the additional area 44 of the gas chamber 40 (which is enclosed by the auxiliary section 30 of the airbag skin 22) prevents the main section 24 of the airbag skin 22 from expanding too strongly in the direction of the side structure of the vehicle, to which the main section 24 would tend because of its direction of rolling.

FIG. 7c shows the items shown in FIG. 7b at a somewhat later point in time. It can be seen here that the border between the additional area 44 and the main area 42 of the airbag 40 is beginning to disappear, so that it is no longer possible to differentiate precisely between the main section 24 and the auxiliary section 30 of the airbag skin 22.

FIG. 7d shows the items represented in FIG. 7c at a later point in time. Here, the border between the main area 42 and the additional area 44 of the gas chamber 40 has completely disappeared, however a thickening of the gas chamber 40 remains in the area in which the additional area 44 was located.

Figure 7E:
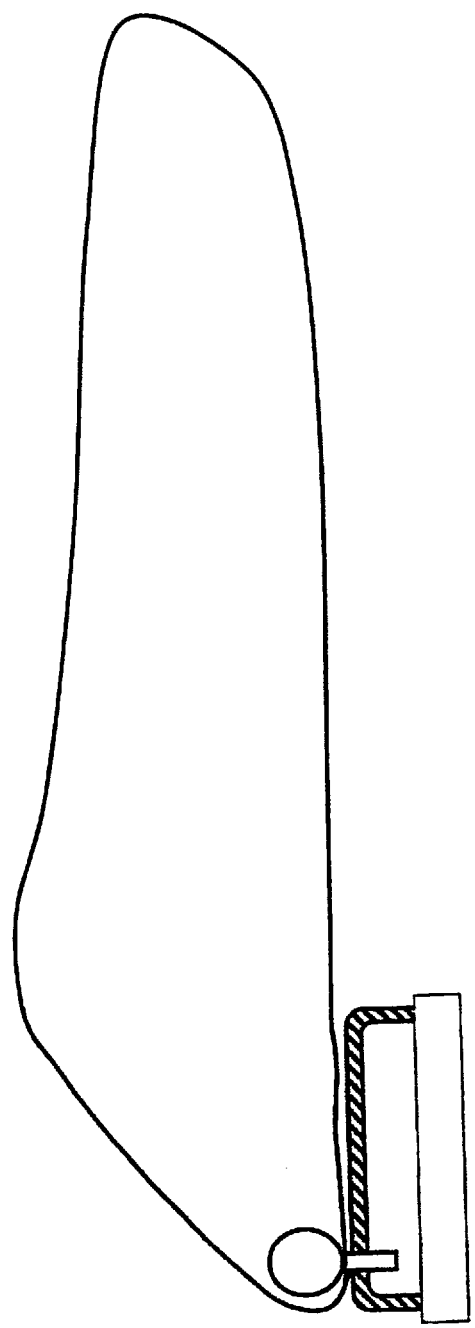

FIG. 7e shows the items represented in FIG. 7d following complete unfolding of the airbag.

FIG. 8 shows the airbag unit in a state as shown in FIG. 7d mounted to the frame 16 of the backrest 12 of a vehicle seat 10. One can see that the retaining element 60 has no housing-type structure since no such housing-type structure is needed order to direct the airbag during deployment.

In the embodiment shown above, the main section 24 of the airbag skin 22 is rolled to the outside in the resting state of the airbag. But it needs to be emphasized that the invention can also be applied to a side airbag whose main section is rolled to the inside.

The FIGS. 9 to 10d show a second configuration of an airbag unit whose airbag skin is very similar to the one of the embodiment shown in FIGS. 1 to 8. Here, the main section 24 of the airbag skin is rolled to the inside and the additional area 44 of the gas chamber is located between the retaining part 60/frame 16 of the back rest and the main area 42 of the gas chamber. So, at the beginning of the deployment (FIGS. 10a to 10c) the main section 24 of the airbag skin is pushed away from the back rest and thus from the occupant. The inboard roll of the main section 24 of the airbag skin prevents the main section 24 from getting stuck to the interior structure of the vehicle (not shown).

In both preferred configurations described above, the rolling direction of the package of the main section of the airbag skin is against the auxiliary section (if the main is rolled to the outside (outboard roll), the auxiliary section encompasses the package from the outside, if the main section is rolled to the inside (inboard roll), the auxiliary section encompasses the package from the inside). In case of deployment this leads to an unrolling of the package of the main section against the auxiliary section which is in most applications essential, as described. In the sense of this application, the term "rolled against" means this kind of configuration.

Instead of having only one auxiliary section of the airbag skin (which is sufficient in the most applications) it is also possible to have two auxiliary sections such that the package of the main section is encompassed from both sides. A possible embodiment is shown in the FIGS. 11 to 15:

The airbag skin is comprised of three cuttings, with the first two cuttings 80, 90 basically having the mushroom-like shape of the cuttings of the first embodiment. The third cutting 100 is basically of rectangular shape with the height of the rectangle corresponding to the height of the second sections 84, 94 of the first and second cutting 80, 90 and the length being basically double the length of the second sections 84, 94 (FIG. 11).

Figure 12:
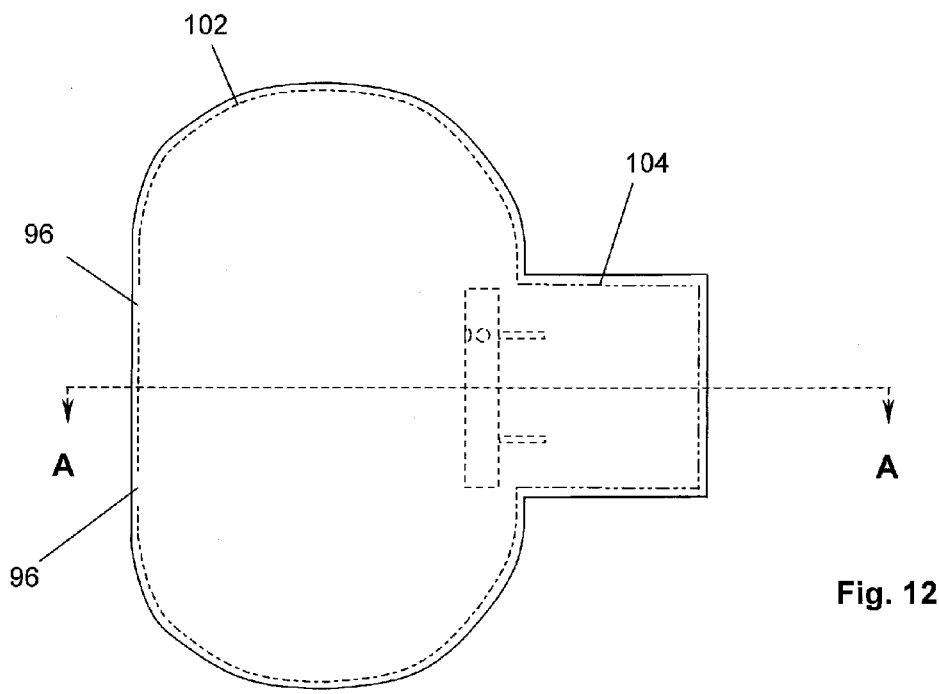
FIG. 12 is a view of a side airbag unit including the cuttings of FIG. 11 and a gas generator.
Figure 13:
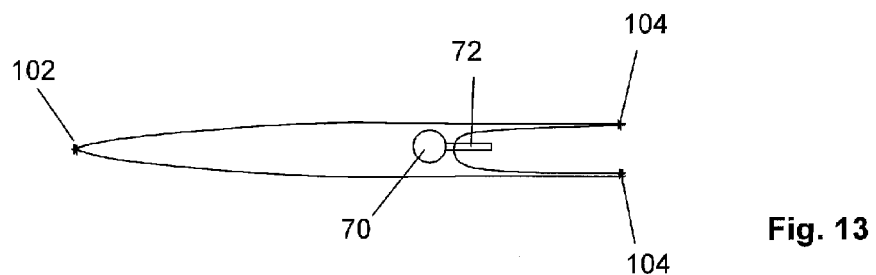
FIG. 13 is a simplified sectional view taken along the line A-A of FIG. 12.
Figure 14:
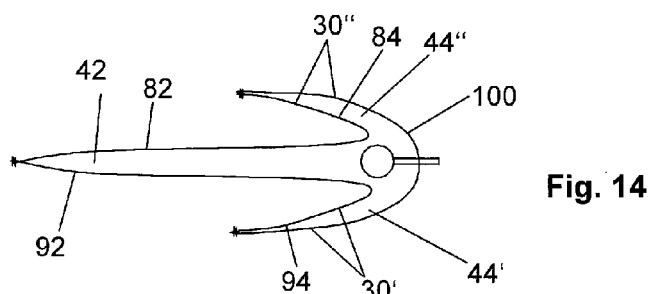
FIG. 14 is a simplified sectional view similar to FIG. 13, shown after folding of an auxiliary section of the airbag skin.

The airbag skin is closed with a first seam 102 connecting the thirst sections 82, 92 of the thirst and the second cutting 80, 90 and a second seam 104 connecting the third cutting 100 to the second sections 84, 94 of the first and the second cutting 80, 90 (FIGS. 12 and 13). As in the first embodiment, the main area 42 of the gas chamber is enclosed between the first sections 82, 92 of the first and the second cutting 80, 90. The additional areas 44', 44" are enclosed between the second sections 84, 94 and the third cutting 100 (FIG. 14).

Figure 15:
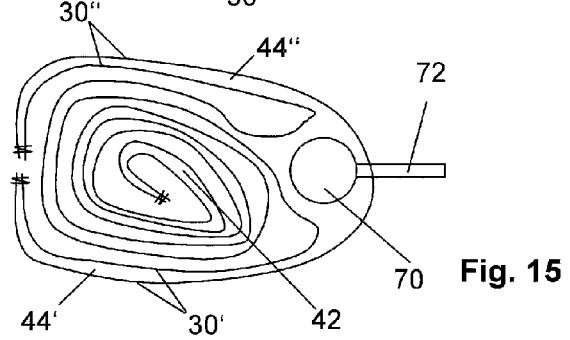
FIG. 15 is a view corresponding to FIG. 14 showing the side airbag unit ready to install.

FIG. 15 shows how the rolled package of the main section of the airbag skin is encompassed by the two auxiliary sections 30', 30" from both sides.

LIST OF REFERENCE NUMBERS

10 Vehicle seat
12 Backrest
14 Side cheek
16 Frame
20 Side airbag unit
22 Airbag skin
24 Main section
30 Auxiliary section
30' first auxiliary section
30" second auxiliary section
40 Gas chamber
42 Main area
44 Additional area 44' first additional area
44" second additional area
50 Fabric section
60 Retaining part
62 First leg
64 Second leg
66 Third leg
70 Gas generator
72 Gas generator bolt
80 First cutting
82 First section
84 Second section
85 Through-hole
86 Fixing hole
87 Set break line (perforation)
90 Second cutting
92 First section
94 Second section
95 Edge seam
96 Interruption in seam
100 third cutting
102 first seam
104 second seam

The invention claimed is:

1. A side airbag unit for mounting on or in a backrest of a vehicle seat comprising:
an inflator for filling a gas chamber; and
an airbag skin enclosing the gas chamber, the airbag skin having a main section for protection of a vehicle occupant when expanded and which in a resting state of the airbag unit defines a package, the package being at least partly rolled, the airbag skin including at least one auxiliary section which in the resting state at least partially encompasses the main section in two layers, an additional area of the gas chamber present between the two layers of the auxiliary section at least in the resting state, the airbag skin further including a flexible section that extends from he auxiliary section, the auxiliary section and the flexible section cooperating to completely encompass the package.

2. The side airbag unit according to claim 1, wherein the main section in the resting state is solely rolled to the package.

3. The side airbag unit according to claim 1, wherein the main section is rolled against the auxiliary section.

4. The side airbag unit according to claim 3, wherein the package is rolled to an outside.

5. The side airbag unit according to claim 3, wherein the package is rolled to an inside.

6. The side airbag unit according to claim 1, wherein the auxiliary section encompasses the package from an outside, viewed from the vehicle seat.

7. The side airbag unit according to claim 6, wherein the package is rolled to an inside.

8. The side airbag unit according to claim 1, wherein the auxiliary section encompasses the package from an inside, viewed from the vehicle seat.

9. The side airbag unit according to claim 8, wherein the package is rolled to an outside.

10. The side airbag unit according to claim 1, wherein when the side airbag is fully expanded, a thickening is present at the auxiliary section.

11. The side airbag unit according to claim 10, wherein no border exists between the main section and the thickening at the auxiliary section in a completely deployed state.

12. The side airbag unit according to claim 1, wherein the auxiliary section is formed more narrow than the main section.

13. The side airbag unit according to claim 1, wherein exactly one auxiliary section is present.

14. The side airbag unit according to claim 1, wherein two auxiliary sections are present with a first auxiliary section encompassing the package from the outside, viewed from the vehicle seat and a second auxiliary section encompassing the package from the inside, viewed from the vehicle seat.

15. The side airbag unit of claim 1 in combination with the vehicle seat.

16. An airbag unit comprising:
an inflator for filling a gas chamber; and
an airbag skin enclosing the gas chamber, the airbag skin having a main section for protection of a vehicle occupant when expanded and which in a resting state of the airbag unit defines a package, the package being at least partly rolled, the airbag skin including at least one auxiliary section which in the resting state at least partially encompasses the main section in two layers, an additional area of the gas chamber present between the two layers of the auxiliary section at least in the resting state, the airbag skin further including a flexible section that extends from the auxiliary section, the auxiliary section and the flexible section cooperating to completely encompass the package.

17. The airbag unit of claim 16, in combination with a vehicle seat having a backrest, the airbag unit carried by the backrest.

18. The airbag unit of claim 16, wherein the airbag unit is a side airbag unit.

19. An airbag skin defining a gas chamber, the airbag skin comprising:
a main section for protection of a vehicle occupant upon expansion and which in a resting state of the skin airbag is present as a package, the package being at least partly rolled;
at least one auxiliary section which in the resting state encompasses the main section in two layers at least in sections, an additional area of the gas chamber present between the two layers of the auxiliary section at least in the resting state; and
a flexible section that extends from the auxiliary section, the auxiliary section and the flexible section cooperating to completely encompass the package.

20. The airbag skin of claim 19, in combination with an airbag unit including the airbag skin and an inflator for filing the gas chamber.

* * * * *